Sept. 8, 1931.    J. W. COX    1,821,931
CONDUIT FITTING
Filed March 27, 1925
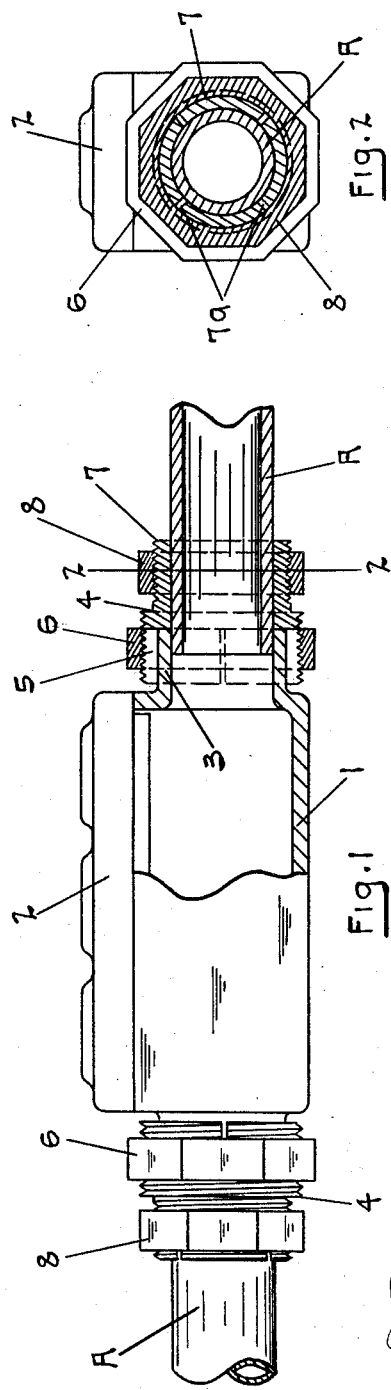

Patented Sept. 8, 1931

1,821,931

UNITED STATES PATENT OFFICE

JOHN WILLIAM COX, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed March 27, 1925. Serial No. 18,801.

This invention relates to conduit fittings, ordinarily in the form of conduit boxes. Such boxes are often used where it is desired to make a coupling with a conduit other than that which was initially designed for the box. The present invention provides a coupling designed for this purpose.

The invention is illustrated in the accompanying drawings as follows:—

Fig. 1 shows a side elevation, partly in section.

Fig. 2 a section on the line 2—2 in Fig. 1.

1 marks the box, 2 its cover, and 3 a conduit extension on the box, ordinarily a threadless extension. A coupling 4 has an end 5 adapted to extend around the extension 3, this end being provided with slits so as to be contractible. A clamping ring 6 is arranged over the extension and adapted to be screwed outwardly on the coupling to clamp the coupling on the extension.

The coupling has a screw-threaded end 7 which is also slitted at 7a so as to make this contractible and provided with a screw-threaded ring 8, which is screwed on from the outer end of the coupling and is thus adapted to contract the outer end into clamping engagement with an inserted conduit A.

In the construction shown, therefore, the coupling is designed to connect an extension with a threadless conduit and is also adapted for attaching a coupling which may be secured to a conduit of a threadless extension.

What I claim as new is:—

In a conduit fitting, the combination of a body having a threadless conduit extension; a coupling comprising a sleeve having threads extending from each end, the internal diameter of said sleeve at one end being smaller than the internal diameter of the sleeve at the opposite end; slits extending from each end, one end of the coupling extending over the threadless conduit extension; and clamping rings screwed from each end adapted to contract the ends of the coupling, one end into clamping engagement with the extension and the opposite end into clamping engagement with an inserted conduit of a diameter insertable into the extension.

In testimony whereof I have hereunto set my hand.

JOHN WILLIAM COX.